United States Patent [19]

Wagman et al.

[11] Patent Number: 5,517,591

[45] Date of Patent: May 14, 1996

[54] COMPACT SLOTTED CORE RIBBON CABLE

[75] Inventors: Richard S. Wagman; Michael R. Ellwanger, both of Hickory, N.C.

[73] Assignee: Siecor Corporation, Hickory, N.C.

[21] Appl. No.: 478,626

[22] Filed: Jun. 7, 1995

[51] Int. Cl.[6] .................................. G02B 6/44
[52] U.S. Cl. ................ 385/110; 385/105; 385/114
[58] Field of Search .................................. 385/104, 105, 385/110, 111, 114, 102, 100

[56] References Cited

U.S. PATENT DOCUMENTS

| | | | |
|---|---|---|---|
| 4,820,014 | 4/1989 | Nishimura et al. | 385/105 |
| 4,826,279 | 5/1989 | Nishimura et al. | 385/102 |
| 4,997,257 | 3/1991 | Spedding | 385/110 |
| 5,199,094 | 3/1993 | Schneider | 385/100 |

FOREIGN PATENT DOCUMENTS

| | | | |
|---|---|---|---|
| 61-53612 | 3/1986 | Japan | 385/105 |
| 62-98313 | 5/1987 | Japan . | |
| 62-204214 | 9/1987 | Japan | 385/105 |
| 4-55803 | 2/1992 | Japan | 385/114 |

OTHER PUBLICATIONS

Preliminary Research into Ultra High Density and High Count Optical Fiber Cables, 40th IWCS pp. 8–15 (1991) [No Month].

Multi-Hundred-Fiber Cable composed of Optical Fiber Ribbons Inserted Tightly Into Slots, 35th IWCS, pp. 17–23 (1986) [No Month].

*Primary Examiner*—John D. Lee
*Attorney, Agent, or Firm*—J. David Abernethy

[57] ABSTRACT

A slotted core type optical fiber ribbon cable includes a cylindrical rod having a plurality of helical slots in its exterior surface. A slot holds a stack of optical fiber ribbons each having a planar array of optical fibers therein. The pitch of the helical slot is selected so as to allow total optical fiber stranding strain $\epsilon$ of the edge fibers in the ribbon to be at least 0.05% and compression $\epsilon_e$ on the middle optical fiber or optical fibers in the ribbon to be less than about 0.03%. The magnitude of the slot pitch is selected to be in the range $P_c < P < P_s$, with $P_c = (-6.718 + 76.094 W_r) + (-2.0467 + 0.33014 W_r) R_r$ and $P_s = (340.92 + 1.3495 W_r + 6.8775 W_r^2) + (4.5417 - 0.07796 W_r - 0.037 W_r^2) R_r$, where P is the slot pitch, $W_r$ is the width spanned by the optical fibers in the ribbon, and $R_r$ is the radial distance between the rod longitudinal axis and the midpoint of the width spanned by the optical fibers in the bottommost ribbon.

22 Claims, 4 Drawing Sheets

5,517,591

COMPACT SLOTTED CORE RIBBON CABLE

BACKGROUND OF THE INVENTION

The field of the invention is slotted core type optical fiber ribbon cables.

Slotted core type optical fiber ribbon cables have been provided for use in subscriber loops. High fiber count type slotted core ribbon cables must be designed so as to keep the increase in signal attenuation the of optical fibers in the cable within acceptable limits. Such attenuation can be caused by excessive bending of the optical fibers due to forces exerted on the optical ribbons.

Most slotted core type optical fiber cables have either helical or periodically reversing helical slots. When an optical fiber ribbon containing a planar array of optical fibers assumes a helical shape during stranding after being placed in a slot having a helical shape, various strains are placed on the optical fibers in the ribbon as a result of the helical configuration alone. The strain e thereby placed on optical fibers in the ribbon during stranding comprises contributions from the elongation strain $\epsilon_e$, bending strain $\epsilon_b$, and twisting strain $\epsilon_t$. Total optical fiber stranding strain due to these contributions may be expressed as $$\epsilon = \tfrac{1}{2}\{(\epsilon_e+\epsilon_b)+\sqrt{[(\epsilon_e+\epsilon_b)^2+(2G\epsilon_t/E)^2]}\}, \quad \text{(Equation 1)}$$

where G is the modulus of elasticity in shear and E is the Young's modulus of the optical fiber. Tomita et al., Preliminary Research into Ultra High Density and High Count Optical Fiber Cables, 40th International Wire and Cable Symposium Proceedings pp. 8–15 (1991). Equation 1 does not include strains associated with a tension (or compression) applied to a ribbon as a whole (for example, due to ribbon back-tension during stranding), nor does it include strains introduced during cable installation. As used herein, total optical fiber stranding strain refers to the strain $\epsilon$ given by Equation 1.

Total fiber stranding strain $\epsilon$ in a slotted core type optical fiber ribbon cable has been taught to be limited to 0.05% or less. Therefore, a helical slot pitch of 700 mm has been selected in the design of one such cable. In addition to fiber strains during manufacturing, installation stresses of 0.20% are to be allowed for. S. Hatano, Y. Katsuyama, T. Kokubun, and K. Hogari Multi-Hundred-Fiber cable composed of optical fiber ribons inserted tightly into slots, 35th International Wire and Cable Symposium Proceedings pp. 17–23 (1986). The helical pitch is sometimes referred to as lay length.

As illustrated in FIG. 3, the radial distance $R_f$ between the center of the cable O and an end optical fiber in a ribbon is longer than the radial distance $R_r$ between the center of the cable and the central optical fiber(s) in the ribbon, or more precisely, the midpoint of the width spanned by the optical fibers in the ribbon in the plane containing the optical fibers. After stranding, this length difference causes the edge optical fibers in a ribbon to be under tension, as recognized by the prior art.

The same effect causes the central optical fibers in the ribbon to be under compression. The width of the ribbon is a factor affecting the amount of compression, with compression increasing with ribbon width. Ribbon width in turn is determined by the number of optical fibers in the ribbon and the thickness of the coatings on the individual optical fibers. The compression is also a function of the radial distance $R_r$ between the ribbon and the center of the cable, which distance must be at least the radial distance of the slot floor from the center of the cable. As the radial distance of the slot floor from the center of the cable increases, the compression typically decreases. The prior art has not fully taken the compression effect into consideration in cable design optimization.

Slotted core type optical fiber ribbon cables containing ribbons each having a relatively small number of optical fibers have been proposed which have somewhat short slot pitches and somewhat higher total strains. For instance, U.S. Pat. No. 4,826,279 proposed a slotted core type optical fiber ribbon cable having five-fiber ribbons with a slot pitch of 300 mm and a slot floor radius of 3.25 mm. However, slotted core type optical fiber ribbon cables containing ribbons each having greater numbers of optical fibers have been taught to have longer slot pitches. For instance, Japanese laid-open patent publication 62-98313 proposed a slotted core type optical fiber ribbon cable having ten-fiber ribbons with a slot pitch of 550 mm and a slot floor radius of 3.25 mm, which would result in a total fiber stranding strain of less than 0.05%.

The helical length of optical ribbons in slotted core type optical fiber ribbon cable is a function of the slot pitch. Thus, all other factors being equal, a longer pitch helps to reduce the cost of a cable by reducing the length of fiber required.

While the factors listed above would tend to support the design of slotted core type optical fiber ribbon cables having a relatively long helical pitch, three other factors set out below tend to support the design of such cables having a shorter pitch.

First, during cable bending, sections of ribbons on the outside of the bend are under tension, and sections of ribbons on the inside of the bend are under compression. The ribbons tend to move to the region of tension to alleviate strains. A shorter pitch advantageously accomodates such movement.

Second, when a slotted core type optical fiber ribbon cable is bent, forces on the ribbons urge the ribbons to rotate to relieve bending. A representation of such rotation is shown in FIG. 4. The more the ribbons rotate, the deeper the slots must be to contain them, so the outer diameter of the core spacer ribs must be greater. A larger cable is the result. We have found that a shorter slot pitch reduces the amount of ribbon rotation. Therefore, all other factors being equal, a shorter slot pitch advantageously reduces the required cable size.

Third, at low temperatures the plastic material in a slotted core type optical fiber ribbon cable tends to shrink. The ribbons typically shrink less than the rest of the cable, generating excess ribbon length and causing pressure to be exerted on the ribbons. Extra space is required to accomodate this excess ribbon length to avoid such pressures. We have found that a shorter pitch reduces the additional space required to accomodate the extra ribbon length resulting from low temperature conditions. Therefore, all other factors being equal, a shorter slot pitch again reduces the required cable size.

As fiber count increases, diameter minimization becomes more important. Optical fiber cables are typically smaller than electrical cables of comparable message capacity. However, optical cables having a high fiber count typically are larger than already installed lower fiber count optical fiber cables, and duct space is usually at a premium. Larger cables also typically have larger minimum bend diameters and may require larger and more specialized reels and stranding equipment.

SUMMARY OF THE INVENTION

It is therefore an object of the present invention to provide high fiber count slotted core type optical fiber ribbon cables which are smaller in outer diameter than comparable cables provided by the prior art.

Another object of the invention is to provide high fiber count slotted core type optical fiber ribbon cables which can more safely accomodate fiber strains caused by cable bending.

Still another object of the invention is to provide high fiber count slotted core type optical fiber ribbon cables which are less susceptible to pressures on the ribbons caused by materials contraction at low temperatures.

Still another object of the invention is to provide high fiber count slotted core type optical fiber ribbon cables which are less susceptible to ribbon stack rotation.

Yet another object of the invention is to provide high fiber count slotted core type optical fiber ribbon cables which are designed to limit the compression experienced by the middle optical fibers in a ribbon during normal operating conditions.

These and other objects are provided, according to the present invention, by providing a slotted core type optical fiber ribbon cable whose design is optimized taking compression on the middle optical fiber(s) in the ribbon into account. Testing has shown that optical fiber attenuation rises unacceptably when such compression is more than 0.03%. While cable outer diameter may be reduced by lowering the lay length of the slots, the 0.03% compression limit is used to establish a lower limit on slot lay length. Curve fitting generates equations to solve for pitch. These equations, whose units are based on length values expressed in millimeters, are set out below. The invention is applicable to cables having either true helical or periodically reversing helical slots.

A slotted core type optical fiber ribbon cable according to the invention comprises a cylindrical rod having a longitudinal axis and having in the exterior surface thereof at least one slot having a helical pitch. There is at least one optical fiber ribbon disposed in the slot. The slot may contain a plurality of optical fiber ribbons arranged in a stack. Each optical fiber ribbon has two major surfaces and comprises a planar array substantially parallel to its major surfaces of at least eight optical fibers. Viewed in cross-section, the optical fibers, including any coatings thereon, span a width, thereby defining a midpoint of the width in the plane containing the optical fibers. A sheath contains the rod and the optical fiber ribbons. The cable typically contains a water-blocking material, which may be a grease or gel-like material within the slots, or a water-absorptive material such as a tape or yarn disposed within the slots or between the outer jacket and the rod.

The magnitude of the slot pitch is selected to be no less than the magnitude at which compression $\epsilon_c$ on the middle optical fiber or optical fibers in the ribbon is 0.03%, and is also selected so that the total optical fiber stranding strain $\epsilon$ on the outer optical fibers in the ribbon is greater than or equal to 0.05%.

To fulfill the foregoing conditions, the magnitude of the slot helical pitch is selected to be in the range $P_c < P < P_s$, with $P_c = (-6.718 + 76.094 W_r) + (-2.0467 + 0.33014 W_r) R_r$ and $P_s = (340.92 + 1.3495 W_r + 6.8775 W_r^2) + (4.5417 - 0.07796 W_r - 0.037 W_r^2) R_r$ where P is the slot pitch, $W_r$ is the width spanned by the optical fibers in the ribbon, and $R_r$ is the radial distance between the rod longitudinal axis and the midpoint of the width spanned by the optical fibers in the ribbon. Formulas herein contemplate the use of values stated in terms of millimeters.

A slotted core type optical fiber ribbon cable in one examplary embodiment of the invention has a pitch in the range from about 150 mm to about 350 mm, and a width spanned by the optical fibers in the ribbon of about 2 millimeters. This ribbon may contain eight coated optical fibers.

Another example of a slotted core type optical fiber ribbon cable made made in accordance with the invention has a pitch in the range from about 225 mm to about 400 mm, and the width spanned by the optical fibers in the ribbon of about 3 millimeters. This ribbon may contain twelve coated optical fibers.

Still another example of a slotted core type optical fiber ribbon cable made in accordance with the invention has a pitch in the range from about 300 mm to about 450 mm, and a width spanned by the optical fibers in the ribbon of about 4 millimeters. This ribbon may contain sixteen coated optical fibers.

Several methods have been found to allow the cable to perform acceptably despite having a total optical fiber stranding strain exceeding 0.05%.

First, a slotted core type optical fiber ribbon cable according to one embodiment of the present invention may include optical fibers having a tensile rating of at least 100,000 pounds per square inch.

Second, a slotted core type optical fiber ribbon cable according to one embodiment of the present invention may include optical fiber ribbons having a percentage excess ribbon length equal to or greater than the value obtained by subtracting 0.05% from the total stranding strain $\epsilon$ of the optical fiber in such ribbon having the highest total stranding strain.

Third, a slotted core type optical fiber ribbon cable according to one embodiment of the present invention may have a percentage rated cable strain during installation of the cable which is less than 0.20%–($\epsilon$–0.05%), where $\epsilon$ is the maximum total stranding strain imparted on the optical fibers during manufacture of the cable.

BRIEF DESCRIPTION OF THE DRAWINGS

The preferred embodiments of the invention are described in the several drawings, in which.

DETAILED DESCRIPTION OF THE INVENTION

The present invention will now be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
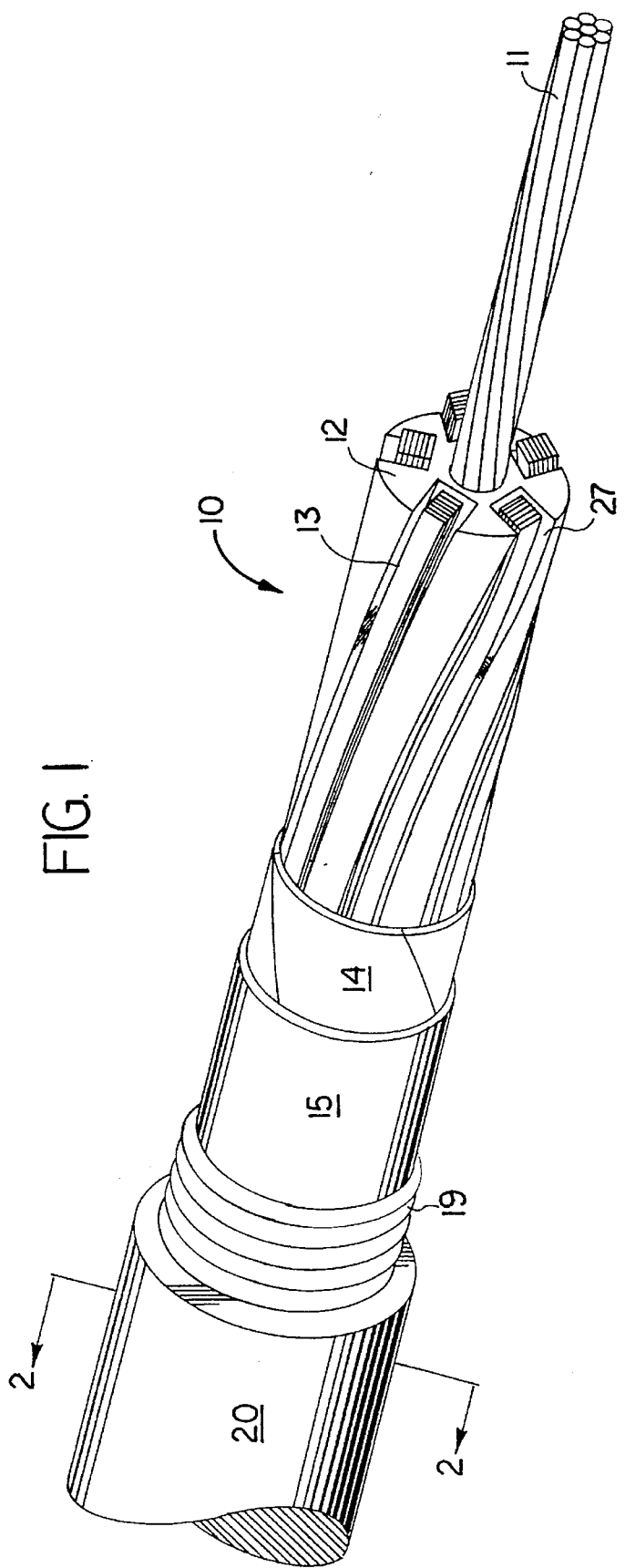
FIG. 1 is an isometric view of a cable according to the invention which has been cut-back for better comprehension thereof.
Figure 2:
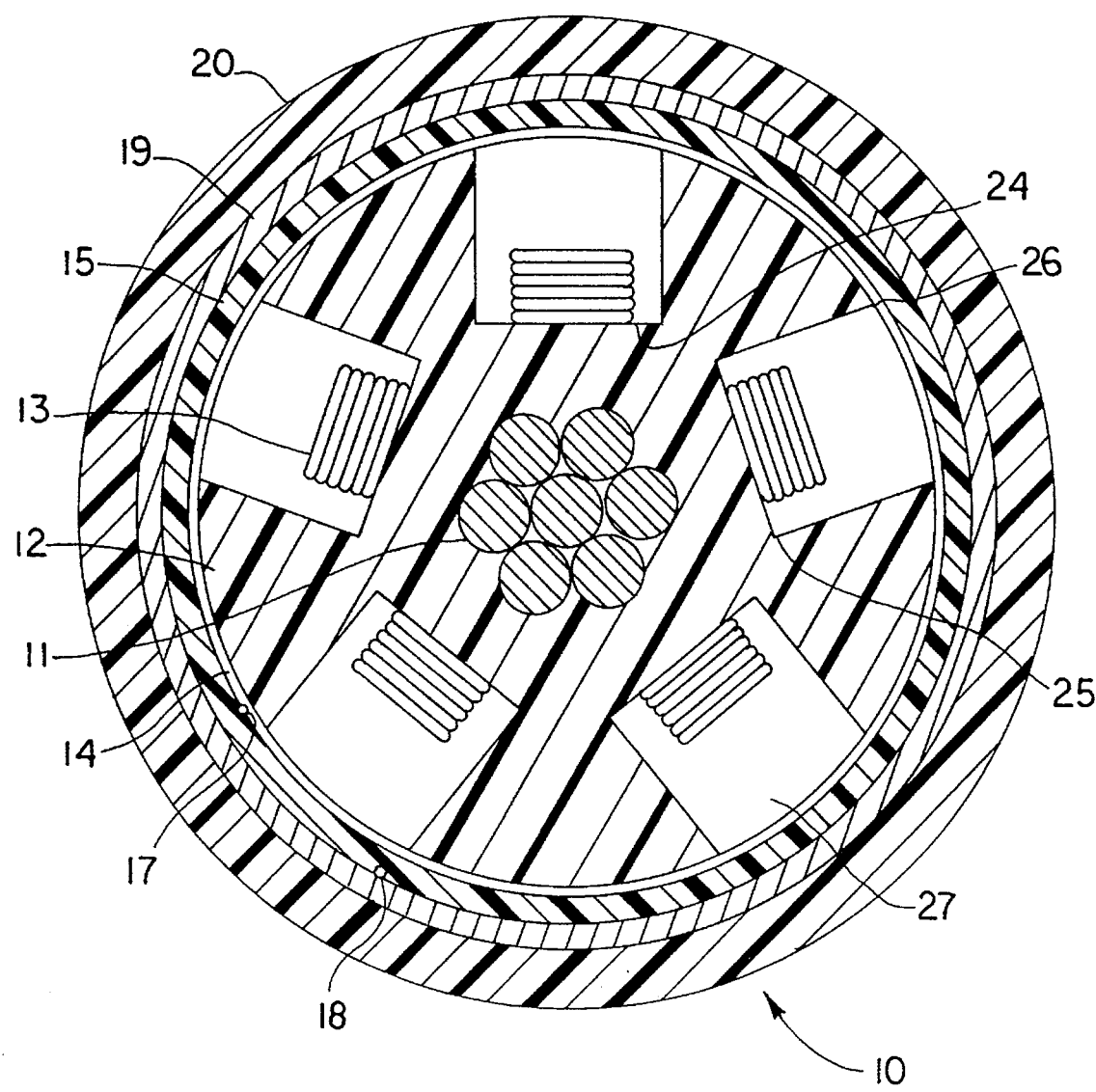
FIG. 2 is a sectional view along lines 2—2 of the cable of FIG. 1.

A slotted core type optical fiber ribbon cable 10 according to the invention is shown in FIGS. 1 and 2. Cables according to the illustrated embodiment may hold between 288 to 360 optical fibers. Of course, other embodiments may hold more optical fibers, such as a 600 fiber cable. Cable 10 includes a central strength member 11 which is used as the pulling element of the cable during installation. It serves both as the cable tensile strength member and the cable compressive strength member. If a metallic central strength member is desired, strength member 11 may be a rope made of stranded steel wires as shown in FIG. 1. The rope may be composed of a central steel wire surrounded by a stranded layer of six steel wires in contact with the central steel wire. In this example, the diameter of the strength member may be 4.8 mm, equal to three times the 1.6 mm diameter of a single steel wire.

In the alternative, central strength member 11 may be nonmetallic. In such a case, a single rod composed of tensile fibers such as glass or aramid fibers embedded in epoxy or plastic may be used.

Surrounding central strength member 11 is a cylindrical rod 12 having a plurality of helical slots 27 in its exterior surface. In the preferred embodiment, rod 12 is made of a plastic material which is extruded over central strength member 11. One may manufacture the so-called slotted core, comprising central strength member 11 surrounded by rod 12, in a separate operation from a stranding line. A method of manufacturing the slotted core with the use of a calibrating device is described in Schneider, U.S. Pat. No. 5,380,472, incorporated herein by reference.

Figure 3:
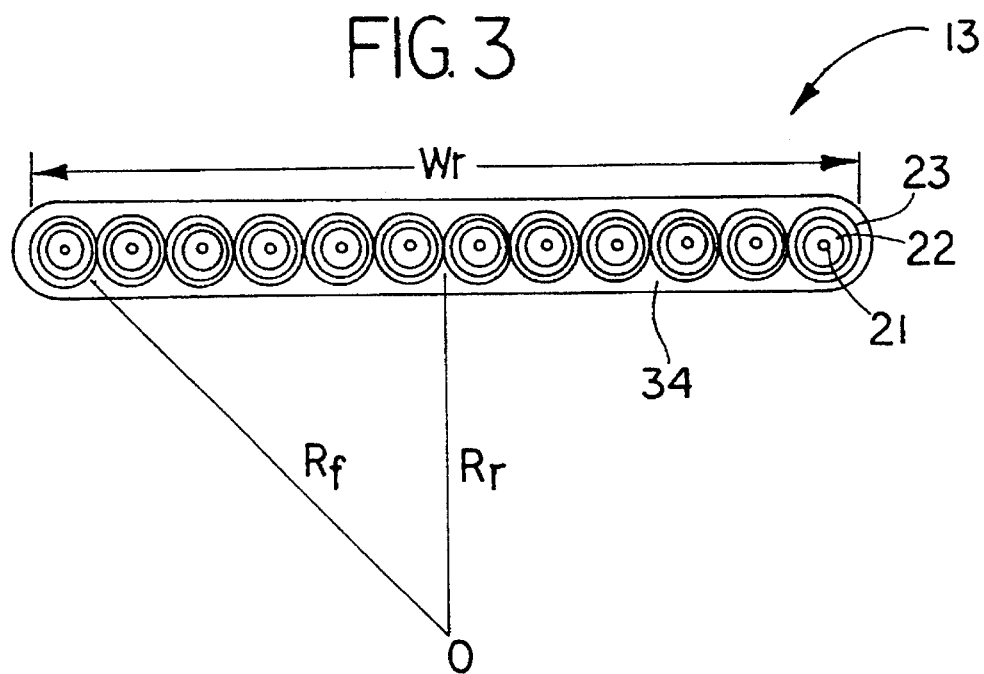
FIG. 3 is a sectional view of an optical fiber ribbon in relation to the cable longitudinal axis.
Figure 4:
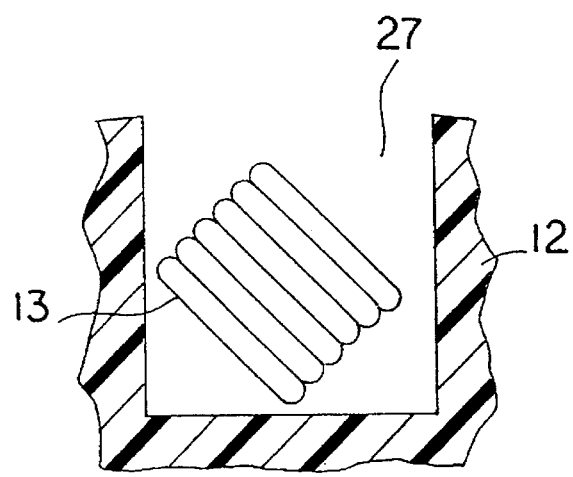
FIG. 4 is a schematic view of rotation of optical ribbon stacks during bending of a cable; and, FIG. 5 is a graph illustrating preferred slot lay length ranges for the cable based on ribbon radius $R_r$ and fiber strain limits.

Each slot 27 in the exterior surface of rod 12 holds a stack of optical fiber ribbons 13, each comprising a planar array of optical fibers as shown in FIG. 3. Each optical fiber has a core 21 and a cladding 22 surrounded by individual coatings 23 thereon comprising a relatively soft primary coating and a relatively harder secondary coating applied directly over the primary coating. Surounding the coated optical fibers is a common ribbon matrix coating 34, which may be formed of a material cureable by ultraviolet light. Each individual optical fiber may have a distinct individual coloring layer to distinguish it from other optical fibers in the ribbon. One of the ribs of the slotted rod extending between the slots may be striped to enable slot identification.

In a preferred embodiment, each stack contains six optical fiber ribbons 13 each containing a planar array of twelve coated optical fibers. Each slot 27 may have a width of 4.0 mm and a height of 4.1 mm. The radial distance of a slot floor 24 from the center of the cable is 3.55 mm, and the so-called web thickness of rod 12 between adjacent slot corners 25 of adjacent slots is around 1.0 mm. A minimum web thickness of 0.90 mm was found desirable when the rod is formed of medium density polyethylene material.

In a preferred cable, no water-blocking gel is placed in slots 27. A tape 14 comprising water-absorptive material directly surrounds rod 12. Over tape 14 is extruded an inner tube 15 formed of plastic material such as polyethylene. An optional armoring layer 19 of metallic material overlies inner tube 15, and an outer sheath of 20 formed of a plastic material such as polyethylene surrounds armoring layer 19.

Cable 10 may also contain one or more rip cords such as rip cords 17, 18 shown in FIG. 2.

The cable performs acceptably in temperatures of −40° C. to +70° C. The cable weighs 500 kg/km and has a diameter of only 22.5 mm. Its minimum bend radius is 36.0 cm during installation, and 27.0 cm as installed.

In the cable as illustrated, helical slots 27 have a pitch of 250 mm. Helical slots 27 contain optical fiber ribbons each having a ribbon radius $R_r$ of 3.7 mm for the optical fiber ribbon along the floor of the slot, each ribbon having a width of approximately 3 mm and containing twelve coated optical fibers.

One way to limit overall strains (including strains during manufacturing and during installation) on the optical fibers is to limit the installation strain, for example by use of a sufficiently large central member. By using the following formula, the overall strains can be kept below 0.25%:

Installation Strain is less than or equal to 0.20%−($\epsilon$−0.05%),
where $\epsilon$ is the total stranding strain.    (Equation 2)

The illustrated cable has a maximum rated tensile loading during installation of 2700N. By using a sufficiently large central strength member 11, the maximum installation strain is 0.11%, and $\epsilon$ is 0.10%. Equation 2 is satisfied [0.11% is less than or equal to 0.20%−(0.10%−0.05%), or 0.15%] and the overall strain is less than 0.25% [0.11%+0.10%=0.21%, which is less than 0.25%].

In an alternate embodiment, excess ribbon length allows the cable to experience initial installation strain without the installation strain causing the optical fibers to experience additional strain. The percentage excess ribbon length of the optical fiber ribbons is made to be greater than or equal to the percentage strain experienced by the optical fibers during manufacturing plus the percentage strain experienced by the optical fibers during installation minus 0.25%.

The helical pitch of slots 27 causes strains on the optical fibers in the ribbons. As illustrated in FIG. 3, the radial distance $R_f$ between the center of the cable O and an end optical fiber in a ribbon is longer than the radial distance $R_r$ between the center of the cable and the central optical fiber(s) in the ribbon. After stranding, this causes the edge optical fibers in a ribbon to be under tension and the central optical fibers to be under compression.

An example of how the desired slot lay length is determined is as follows.

Given a ribbon radius $R_r$ of 3.7 mm and optical fibers each having an individual coating thereon whose outer diameter is 250 μm, Table 1 below sets out the radius $R_f$ of each individual optical fiber in the twelve-fiber optical fiber ribbon adjacent to the floor of the slot. Optical fibers are numbered from left to right, with fibers 6 and 7 being the middle optical fibers in the ribbon. Due to symmetry, data for Fiber # 1 equals the data for Fiber # 12, data for Fiber #2 equals the data for Fiber # 11, and so on.

TABLE 1

| Radius $R_f$ of each optical fiber in the twelve-fiber ribbon, ribbon radius $R_r$ = 3.7 mm | | | | | | |
| --- | --- | --- | --- | --- | --- | --- |
| Fiber no. | 1 or 12 | 2 or 11 | 3 or 10 | 4 or 9 | 5 or 8 | 6 or 7 |
| $R_f$ | 3.9472 | 3.8673 | 3.8021 | 3.7524 | 3.7190 | 3.7021 |

For each optical fiber i of Table 1, $HL_i$, the ratio of the length of the optical fiber i to the length of the axis of the rod for any given rod axis length, is set out in Table 2. This ratio can be expressed as $HL_i = \sqrt{1+(2\pi R_f/P)^2}$, where $R_i$ is the distance from the center of fiber i to the center of the rod and P is the slot pitch.

TABLE 2

| Pitch | Ratio for each optical fiber of helical length to length of rod axis and their mean | | | | | | |
|---|---|---|---|---|---|---|---|
| | Optical Fiber Number | | | | | | |
| (mm) | 1 or 12 | 2 or 11 | 3 or 10 | 4 or 9 | 5 or 8 | 6 or 7 | Mean |
| 200 | 1.00766 | 1.00735 | 1.00711 | 1.00693 | 1.00680 | 1.00674 | 1.00710 |
| 250 | 1.00491 | 1.00471 | 1.00456 | 1.00444 | 1.00436 | 1.00432 | 1.00455 |
| 400 | 1.00192 | 1.00184 | 1.00178 | 1.00174 | 1.00171 | 1.00169 | 1.00178 |

The elongation strain $\epsilon$ for each optical fiber is shown in Table 3. Values in Table 3 are obtained using the data from Table 2 by subtracting the value of the mean from the value of the individual fiber. Negative elongation strains indicate compression.

TABLE 3

| Pitch | Percentage Elongation strains $\epsilon_e$ for each optical fiber | | | | | |
|---|---|---|---|---|---|---|
| | Optical fiber number | | | | | |
| (mm) | 1 or 12 | 2 or 11 | 3 or 10 | 4 or 9 | 5 or 8 | 6 or 7 |
| 200 | 0.056 | 0.026 | 0.001 | −0.017 | −0.030 | −0.036 |
| 250 | 0.036 | 0.016 | 0.001 | −0.011 | −0.019 | −0.023 |
| 400 | 0.014 | 0.006 | 0.000 | −0.004 | −0.007 | −0.009 |

Figure 5:
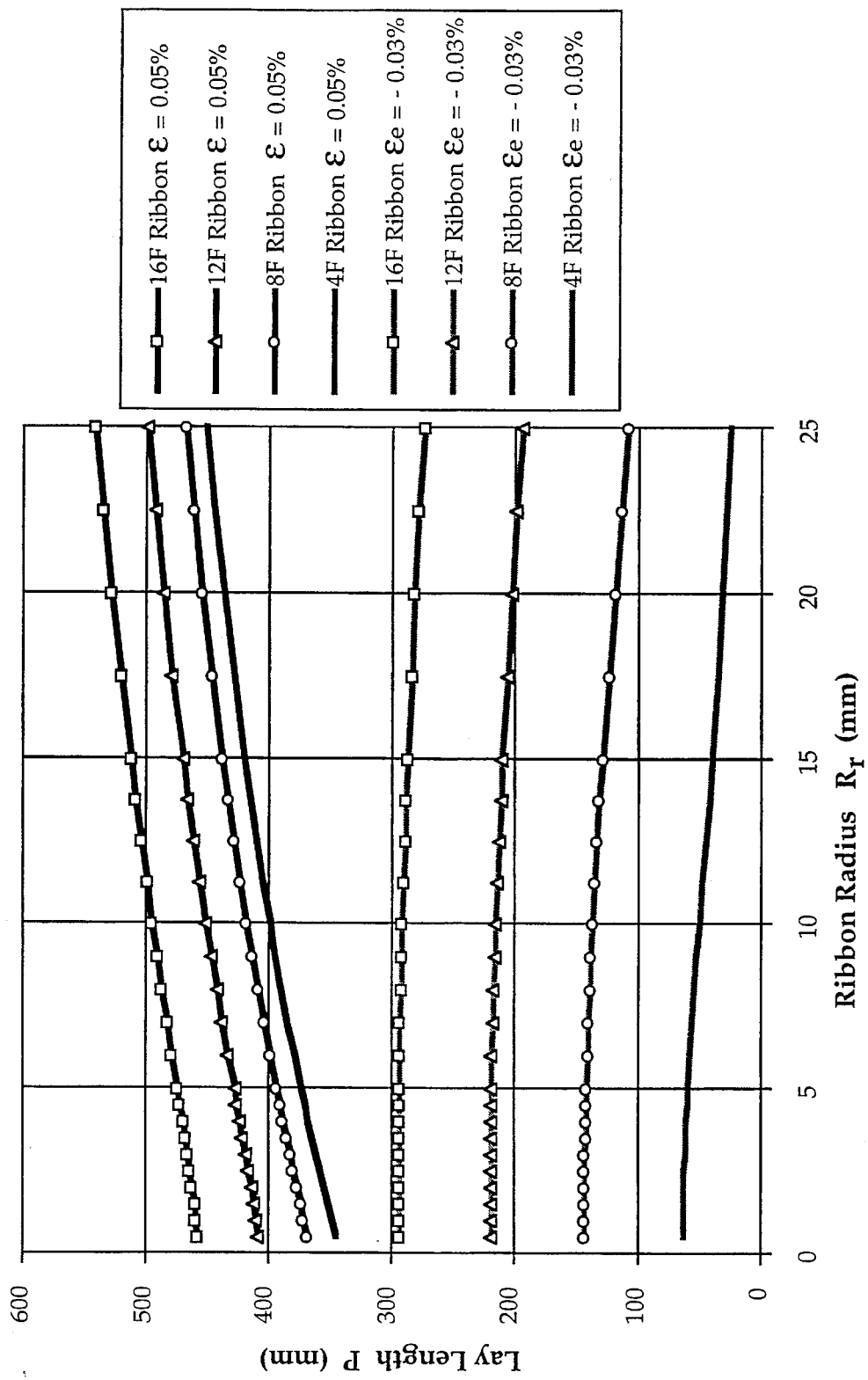

Now refer to FIG. 5. The data points in the lower four lines in FIG. 5 were obtained by letting $\epsilon_e$ for the middle fibers of the ribbon be −0.030 and then solving for ribbon radius for a given helical pitch, called lay length in FIG. 5. The use of coated optical fibers having an outer diameter of 250 microns was assumed. The lower set of points thus represents the conditions at which the compression on the middle optical fibers is equal to 0.30%. Increased attenuation on the optical fibers was found to be within acceptable limits when the 0.30% limit was not exceeded.

The data points in the upper set of four lines in FIG. 5 represent the conditions at which total stranding strain $\epsilon$ on the outer optical fibers in the ribbon is 0.05%. Using curve fitting, the following equation was generated for the lower set of curves:

$$P_c = (-6.718 + 76.094 W_r) + (-2.0467 + 0.33014 W_r) R_r.$$

Again using curve fitting, the following equation was generated for the upper set of curves:

$$P_s = (340.92 + 1.3495 W_r + 6.8775 W_r^2) + (4.5417 - 0.07796 W_r - 0.037 W_r^2) R_r.$$

The magnitude of the slot helical pitch was therefore selected to be in the range $$P_c < P < P_s, \text{ with}$$

$$P_c = (-6.718 + 76.094 W_r) + (-2.0467 + 0.33014 W_r) R_r, \text{ and}$$

$$P_s = (340.92 + 1.3495 W_r + 6.8775 W_r^2) + (4.5417 - 0.07796 W_r - 0.037 W_r^2) R_r,$$

where P is the slot helical pitch, $W_r$ is the width spanned by the optical fibers in the ribbon, and $R_r$ is the radial distance between the rod longitudinal axis and the midpoint of the width spanned by the optical fibers in the ribbon.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A slotted core type optical fiber ribbon cable, comprising:

a cylindrical rod having a longitudinal axis and having in the exterior surface thereof at least one slot having a helical pitch, said slot having a floor; an optical fiber ribbon having a major surface disposed adjacent to said slot floor in said at least one slot, said ribbon comprising a planar array of at least eight optical fibers which in cross-section span a width, thereby defining a midpoint of the width in the plane containing the optical fibers; and, a sheath containing the rod and the optical fiber ribbons, wherein the magnitude of the slot pitch is selected to be in the range $$P_c < P < P_s, \text{ with}$$

$$P_c = (-6.718 + 76.094 W_r) + (-2.0467 + 0.33014 W_r) R_r, \text{ and}$$

$$P_s = (340.92 + 1.3495 W_r + 6.8775 W_r^2) + (4.5417 - 0.07796 W_r - 0.037 W_r^2) R_r,$$

where P is the slot pitch, $W_r$ is the width spanned by the optical fibers in the ribbon, and $R_r$ is the radial distance between the rod longitudinal axis and the midpoint of the width spanned by the optical fibers in said ribbon.

2. A slotted core type optical fiber ribbon cable as set out in claim 1, wherein the pitch of the helical slot is in the range from about 150 mm to about 350 mm, and the width spanned by the optical fibers in the ribbon is about 2 millimeters.

3. A cable as set out in claim 2, wherein the ribbon contains eight coated optical fibers.

4. A slotted core type optical fiber ribbon cable as set out in claim 1, wherein the pitch of the helical slot is in the range from about 225 mm to about 400 mm, and the width spanned by the optical fibers in the ribbon is about 3 millimeters.

5. A cable as set out in claim 4, wherein the ribbon contains twelve coated optical fibers.

6. A slotted core type optical fiber ribbon cable as set out in claim 1, wherein the pitch of the helical slot is in the range from about 300 mm to about 450 mm, and the width spanned by the optical fibers in the ribbon is about 4 millimeters.

7. A cable as set out in claim 6, wherein the ribbon contains sixteen coated optical fibers.

8. A cable as set out in claim 1, wherein each optical fiber has a tensile rating of at least 100,000 pounds per square inch.

9. A cable as set out in claim 1, wherein the percentage of excess ribbon length is equal to or greater than the value obtained by subtracting 0.05% from the total stranding strain of the optical fiber having the highest total stranding strain in such ribbon.

10. A cable as set out in claim 1, wherein the percentage rated cable strain during installation of the cable is less than 0.20%−($\epsilon$−0.05%), where $\epsilon$ is the maximum total stranding strain imparted on the optical fibers during manufacture of the cable.

11. A cable as set out in claim 1, wherein the percentage excess ribbon length of the optical fiber ribbon is greater than or equal to the maximum percentage stranding strain experienced by the optical fibers during manufacturing plus the percentage strain experienced by the optical fibers during installation minus 0.25%.

12. A slotted core type optical fiber ribbon cable, comprising:

a cylindrical rod having a longitudinal axis and having in the exterior surface thereof at least one slot having a helical pitch;

at least one optical fiber ribbon disposed in said at least one slot, each such ribbon comprising a planar array of at least eight optical fibers; and, a sheath containing the rod and the optical fiber ribbons, wherein the magnitude of the slot pitch is selected to be no less than the magnitude at which compression $\epsilon_c$ on the middle optical fiber or optical fibers in the ribbon is 0.03%, and is selected so that the total stranding strain $\epsilon$ on the outer optical fibers in the ribbon is greater than or equal to 0.05%.

13. A slotted core type optical fiber ribbon cable as set out in claim 12, wherein the pitch of the helical slot is in the range from about 150 mm to about 350 mm, and the width spanned by the optical fibers in the ribbon is about 2 millimeters.

14. A cable as set out in claim 13, wherein the ribbon contains eight coated optical fibers.

15. A slotted core type optical fiber ribbon cable as set out in claim 12, wherein the pitch of the helical slot is in the range from about 225 mm to about 400 mm, and the width spanned by the optical fibers in the ribbon is about 3 millimeters.

16. A cable as set out in claim 15, wherein the ribbon contains twelve coated optical fibers.

17. A slotted core type optical fiber ribbon cable as set out in claim 12, wherein the pitch of the helical slot is in the range from about 300 mm to about 450 mm, and the width spanned by the optical fibers in the ribbon is about 4 millimeters.

18. A cable as set out in claim 17, wherein the ribbon contains sixteen coated optical fibers.

19. A cable as set out in claim 12, wherein each optical fiber has a tensile rating of at least 100,000 pounds per square inch.

20. A cable as set out in claim 12, wherein the percentage excess ribbon length is equal to or greater than the value obtained by subtracting 0.05% from the total stranding strain of the optical fiber having the highest total stranding strain in such ribbon.

21. A cable as set out in claim 12, wherein the percentage rated cable strain during installation of the cable is less than 0.20%−($\epsilon$−0.05%), where $\epsilon$ is the maximum total stranding strain imparted on the optical fibers during manufacture of the cable.

22. A cable as set out in claim 12, wherein the percentage excess ribbon length of the optical fiber ribbon is greater than or equal to the maximum percentage stranding strain experienced by the optical fibers during manufacture plus the percentage strain experienced by the optical fibers during installation minus 0.25%.

* * * * *